United States Patent
Patil et al.

(10) Patent No.: US 12,452,736 B2
(45) Date of Patent: *Oct. 21, 2025

(54) SYSTEMS AND METHODS FOR SUPPORTING MULTI-ACCESS EDGE COMPUTING USING APPLICATION-BASED QUALITY OF SERVICE FLOWS

(71) Applicant: Verizon Patent and Licensing Inc., Basking Ridge, NJ (US)

(72) Inventors: Sudhakar Reddy Patil, Flower Mound, TX (US); Jignesh S. Panchal, Hillsborough, NJ (US); Maqbool Chauhan, Keller, TX (US); Violeta Cakulev, Milburn, NJ (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/421,010

(22) Filed: Jan. 24, 2024

(65) Prior Publication Data

US 2024/0163725 A1    May 16, 2024

Related U.S. Application Data

(63) Continuation of application No. 17/302,713, filed on May 11, 2021, now Pat. No. 11,895,537.

(51) Int. Cl.
*H04W 28/10* (2009.01)
*H04W 28/02* (2009.01)
*H04W 76/10* (2018.01)

(52) U.S. Cl.
CPC ....... *H04W 28/10* (2013.01); *H04W 28/0268* (2013.01); *H04W 76/10* (2018.02)

(58) Field of Classification Search
CPC .. H04W 28/10; H04W 28/0268; H04W 76/10
See application file for complete search history.

(56) References Cited

U.S. PATENT DOCUMENTS

| | | | |
|---|---|---|---|
| 10,574,670 B1 * | 2/2020 | Verma | H04W 12/72 |
| 10,841,974 B1 * | 11/2020 | Young | H04W 76/30 |
| 10,972,552 B2 * | 4/2021 | Li | H04L 47/19 |
| 11,895,537 B2 * | 2/2024 | Patil | H04W 28/10 |
| 12,081,306 B2 * | 9/2024 | Dong | H04W 72/1263 |
| 2019/0116486 A1 * | 4/2019 | Kim | H04W 8/10 |
| 2019/0191330 A1 * | 6/2019 | Dao | H04L 12/4633 |
| 2020/0205208 A1 * | 6/2020 | Hu | H04W 8/26 |
| 2020/0252785 A1 * | 8/2020 | Wu | H04W 28/06 |

(Continued)

FOREIGN PATENT DOCUMENTS

EP    3755014    12/2020

*Primary Examiner* — Parth Patel

(57) ABSTRACT

A network device may select a first user plane function for establishing, with a user equipment, a protocol data unit session with a single flow and may receive an application function trigger associated with a first new flow for a first application of the user equipment. The network device may cause a first traffic filter to be provided to the user equipment to enable the user equipment to route first application traffic, based on the first traffic filter, to a second user plane function and a first multi-access edge computing device associated with the second user plane function.

20 Claims, 10 Drawing Sheets

(56) References Cited

U.S. PATENT DOCUMENTS

| | | | |
|---|---|---|---|
| 2020/0267785 A1* | 8/2020 | Talebi Fard | H04L 45/04 |
| 2020/0374765 A1* | 11/2020 | Zong | H04W 36/0011 |
| 2021/0058752 A1* | 2/2021 | Szilágyi | H04L 69/22 |
| 2021/0100061 A1* | 4/2021 | Park | H04W 76/27 |
| 2021/0168848 A1* | 6/2021 | Chatterjee | H04W 8/24 |
| 2021/0321367 A1* | 10/2021 | Zhang | H04W 76/14 |
| 2021/0409375 A1* | 12/2021 | Burakovsky | H04L 63/0263 |
| 2022/0007180 A1* | 1/2022 | Liao | H04L 67/14 |
| 2022/0038554 A1* | 2/2022 | Merwaday | H04L 45/64 |
| 2022/0200813 A1* | 6/2022 | Thiebaut | H04L 12/1407 |
| 2022/0322048 A1* | 10/2022 | Godin | H04W 76/30 |
| 2022/0360977 A1* | 11/2022 | Kim | H04L 65/80 |
| 2022/0368617 A1* | 11/2022 | Xin | H04L 41/5067 |
| 2022/0369165 A1* | 11/2022 | Patil | H04W 76/10 |
| 2022/0386165 A1* | 12/2022 | Liu | H04W 76/14 |
| 2023/0037031 A1* | 2/2023 | Wang | H04W 8/08 |
| 2023/0056647 A1* | 2/2023 | Zhang | H04W 72/0453 |
| 2023/0065481 A1* | 3/2023 | Xiong | H04W 36/0011 |
| 2023/0075039 A1* | 3/2023 | Li | H04W 72/02 |
| 2023/0080830 A1* | 3/2023 | Fernandez Alonso | H04M 15/8038 455/422.1 |
| 2023/0155841 A1* | 5/2023 | Koh | H04W 12/037 713/156 |
| 2023/0180038 A1* | 6/2023 | Chen | H04W 24/08 370/252 |
| 2023/0180325 A1* | 6/2023 | Wang | H04W 76/18 370/329 |
| 2023/0284274 A1* | 9/2023 | Loehr | H04L 1/187 370/329 |
| 2023/0284299 A1* | 9/2023 | Paladugu | H04W 76/14 370/329 |
| 2023/0354313 A1* | 11/2023 | Yin | H04W 72/0446 |
| 2024/0163071 A1* | 5/2024 | Kumagai | H04L 27/26 |

* cited by examiner

SYSTEMS AND METHODS FOR SUPPORTING MULTI-ACCESS EDGE COMPUTING USING APPLICATION-BASED QUALITY OF SERVICE FLOWS

RELATED APPLICATION

This application is a continuation of U.S. patent application Ser. No. 17/302,713, filed May 11, 2021 (now U.S. Pat. No. 11,895,537), which is incorporated herein by reference in its entirety.

BACKGROUND

Multi-access edge computing (MEC) is a network architecture that enables cloud computing capabilities and an information technology service environment at an edge of a network, such as a cellular network. MEC enables execution of applications and performance of related processing tasks closer to a network customer (e.g., a user equipment or UE), which may reduce network congestion and improve performance of applications.

DETAILED DESCRIPTION OF PREFERRED EMBODIMENTS

Figure 1A:
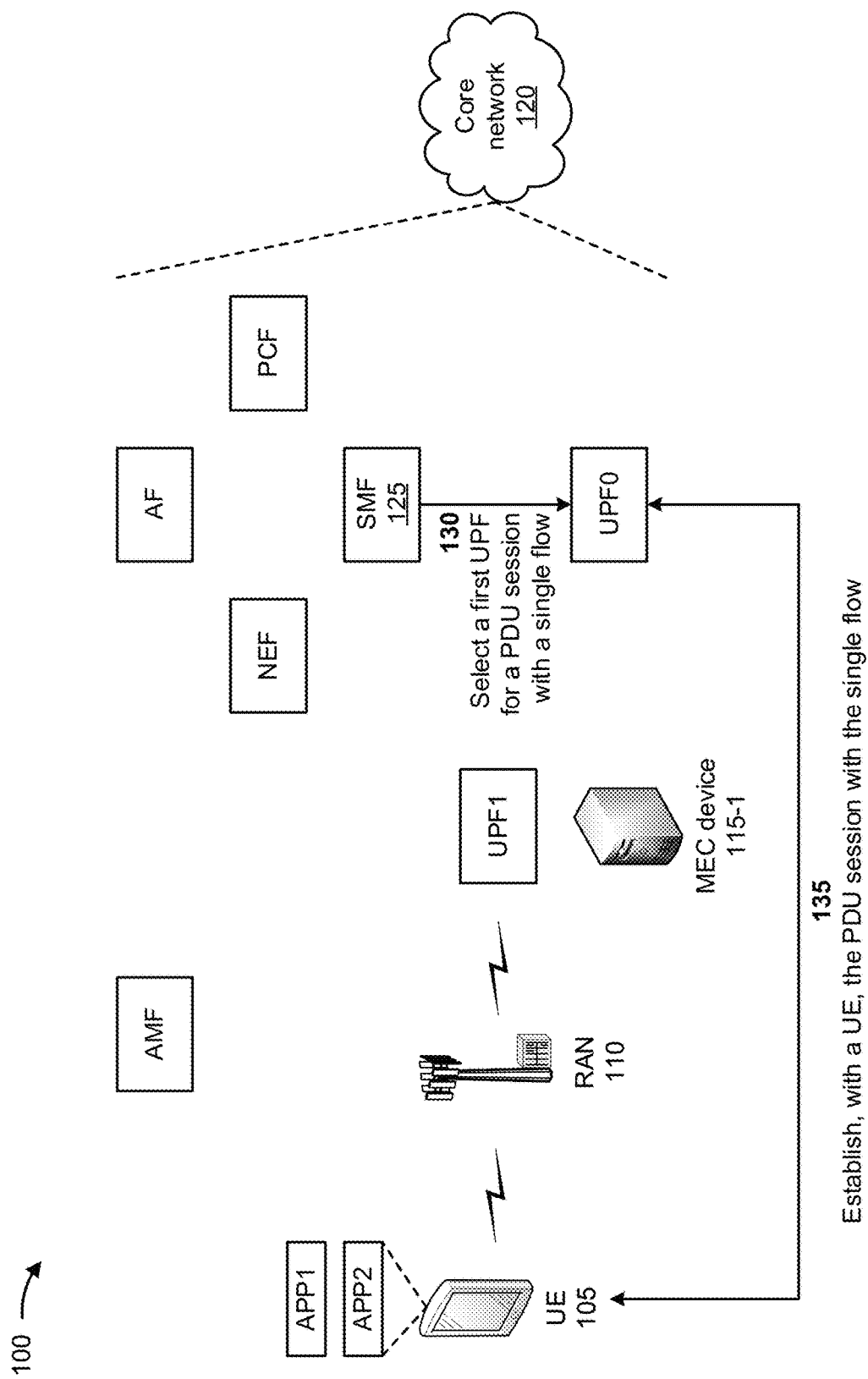
FIGS. 1A-1G are diagrams of an example associated with supporting multi-access edge computing (MEC) using application-based quality of service (QoS) flows.

The following detailed description of example implementations refers to the accompanying drawings. The same reference numbers in different drawings may identify the same or similar elements.

Multi-access edge computing (MEC) enables operator or third-party services to be hosted close to an access point of attachment of user equipment (UE) and may reduce end-to-end latency and load on a transport network. There are multiple connectivity models that support MEC, such as a distributed anchor point model, a session breakout model, a multiple protocol data unit (PDU) sessions model, and/or the like. However, such models require extensive UE route selection policy (URSP) support from UEs that current UEs do not provide due to current configurations of UEs and networks. Furthermore, the current models fail to treat different traffic from a UE with different QoS requirements. For example, application traffic from the UE should be allocated a greater QoS than other traffic from the UE, such as a bulk file transfer.

Thus, current connectivity models that support MEC waste computing resources (e.g., processing resources, memory resources, communication resources, and/or the like), networking resources, and other resources associated with addressing a poor user experience for application traffic at a UE, handling customer complaints associated with the poor user experience, handling traffic with an unnecessary QoS, depending on URSP support from UEs, among other examples.

Some implementations described herein include a network device (e.g., session management function or SMF) that supports MEC using application-based QoS flows. For example, the SMF may select a first user plane function (UPF) for establishing, with a UE, a PDU session with a single flow (e.g., a quality of service (QoS) flow for traffic associated with the QoS) and may receive an application function (AF) trigger associated with a first new flow for a first application of the UE. The SMF may select a second UPF for the first new flow and may create a first traffic filter for the first new flow. The SMF may cause the first traffic filter to be provided to the UE so that first application traffic is routed, based on the first traffic filter, to the second UPF and a first MEC device associated with the second UPF.

In this way, the SMF supports MEC using application-based QoS flows. The SMF may divide traffic per application (e.g., an MEC-based application) at a UE per flow level rather than per PDU session level. A PDU session provides end-to-end user plane connectivity between the UE and a specific data network through the UPF. Moreover, the SMF may enable logical channel prioritization to be utilized at the UE to prioritize QoS flows when mapped to a data radio bearer (DRB) and to provide intra-UE inter-application uplink transmission prioritization (e.g., to support a low latency MEC application). Thus, the SMF conserves computing resources, networking resources, and/or the like that would otherwise be consumed in addressing a poor user experience for application traffic at a UE, handling customer complaints associated with the poor user experience, handling traffic with an unnecessary QoS, depending on URSP support from UEs, among other examples.

FIGS. 1A-1G are diagrams of an example 100 associated with supporting MEC using application-based QoS flows. As shown in FIGS. 1A-1G, example 100 includes a UE 105 associated with a radio access network (RAN) 110, a first MEC device 115-1, and a core network 120. The UE 105 may include a first application (APP1) and a second application (APP2). Each of the first application and the second application may include an MEC application provided by an MEC device, such as the first MEC device 115-1. The core network 120 may include access and mobility management function (AMF), an application function (AF), a network exposure function (NEF), a policy control function (PCF), a session management function (SMF) 125, a first user plane function (UPF0), and a second UPF (UPF1). Further details of the UE 105, the RAN 110, the MEC device 115, the core network 120, the AMF, the AF, the NEF, the PCF, the SMF, and the UPFs are provided elsewhere herein.

As shown in FIG. 1A, and by reference number 130, the SMF 125 may select a first UPF (e.g., UPF0) for a PDU session with a single flow. Alternatively, the SMF 125 may select the second UPF (e.g., UPF1) for the PDU session with the single flow. In some implementations, the SMF 125 may select the first UPF based on a traffic load of the PDU session, a geographic location of the first UPF relative to the UE 105, a PDU session type, and/or the like. The SMF 125 may also select the PCF during setup of the PDU session. The SMF 125 may select the PCF to provide a policy for the PDU session. The PDU session may support a single QoS flow for a session between the first UPF and the UE 105.

As further shown in FIG. 1A, and by reference number 135, the first UPF may establish, with the UE 105, the PDU session with the single flow. The PDU session provides end-to-end user plane connectivity between the UE 105 and a data network through the first UPF. The UE 105 may receive services through the PDU session, such as services of a MEC device 115 associated with the first application and/or the second application of the UE 105. The PDU session may include an Internet protocol (IP) version 4 (IPv4) PDU session, an IP version 6 (IPv6) PDU session, an Ethernet PDU session, and/or the like.

Figure 1B:
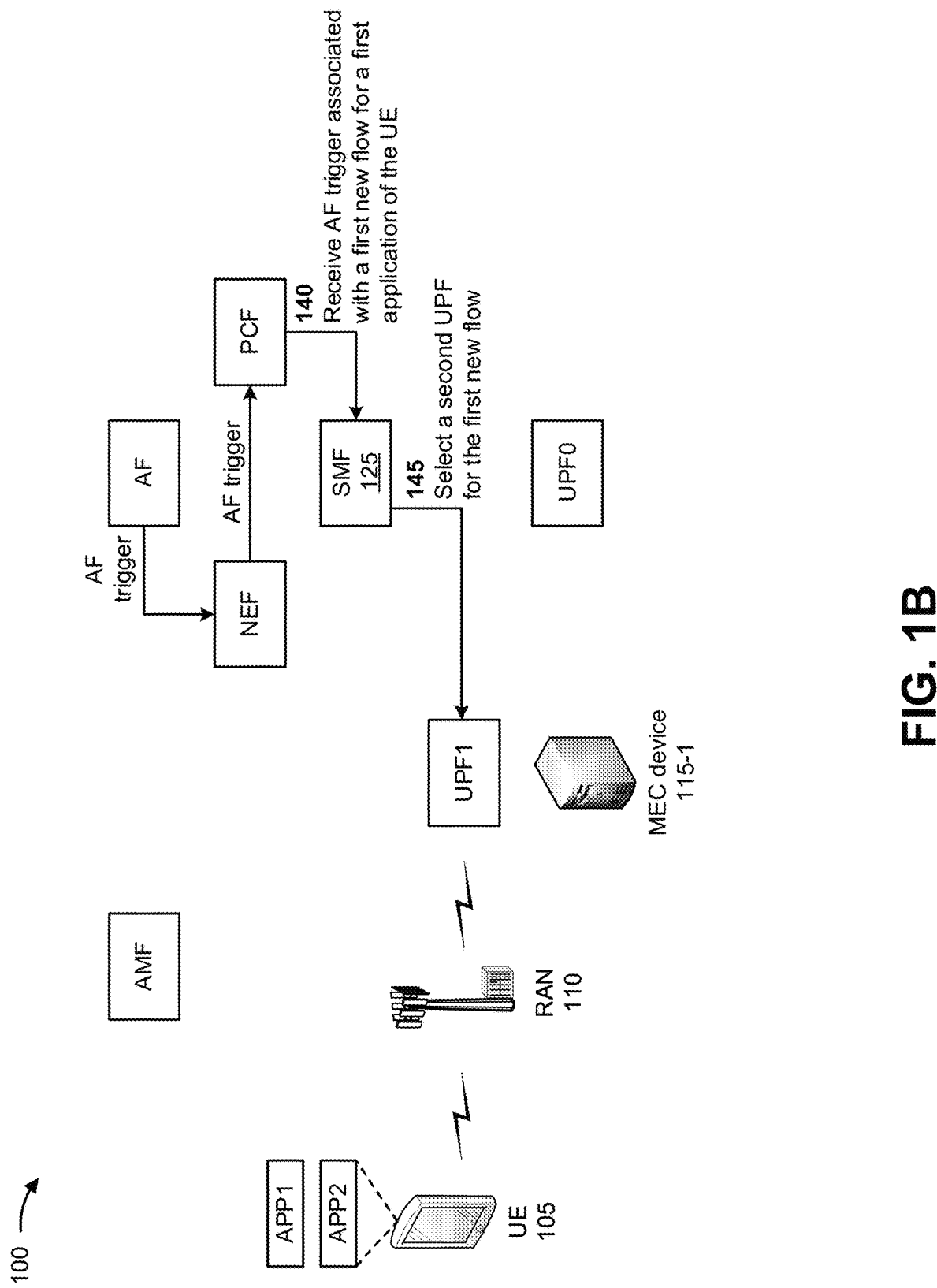

As shown in FIG. 1B, the AF may generate an AF trigger and may provide the AF trigger to the NEF. The AF trigger may be associated with a first new flow for the first application of the UE 105. The AF may receive, from the SMF 125, an indication of utilization of the first application by the UE 105 and may generate the AF trigger based on the indication. The AF trigger may include information identifying the UE 105 (e.g., an International Mobile Subscriber Identity (IMSI), a Subscription Permanent Identifier (SUPI), and/or the like), the first application of the UE 105, the first new flow for the first application, and/or the like. As further shown, the NEF may provide the AF trigger to the PCF and the PCF may provide the AF trigger to the SMF 125.

As further shown in FIG. 1B, and by reference number 140, the SMF 125 may receive, from the PCF, the AF trigger associated with the first new flow for the first application of the UE 105. The SMF 125 may process the AF trigger to identify the UE 105, the first application of the UE 105, and the first new flow for the first application, and/or the like.

As further shown in FIG. 1B, and by reference number 145, the SMF 125 may select the second UPF (e.g., UPF1) for the first new flow. The SMF 125 may select the second UPF for the first new flow so that a particular QoS may be applied to the first new flow and the first application. For example, the AF trigger may cause the SMF 125 to select the second UPF for the first new flow. In some implementations, the SMF 125 may select the second UPF based on a traffic load of the first new flow, a geographic location of the second UPF relative to the UE 105, a flow type of the first new flow, and/or the like.

Figure 1C:
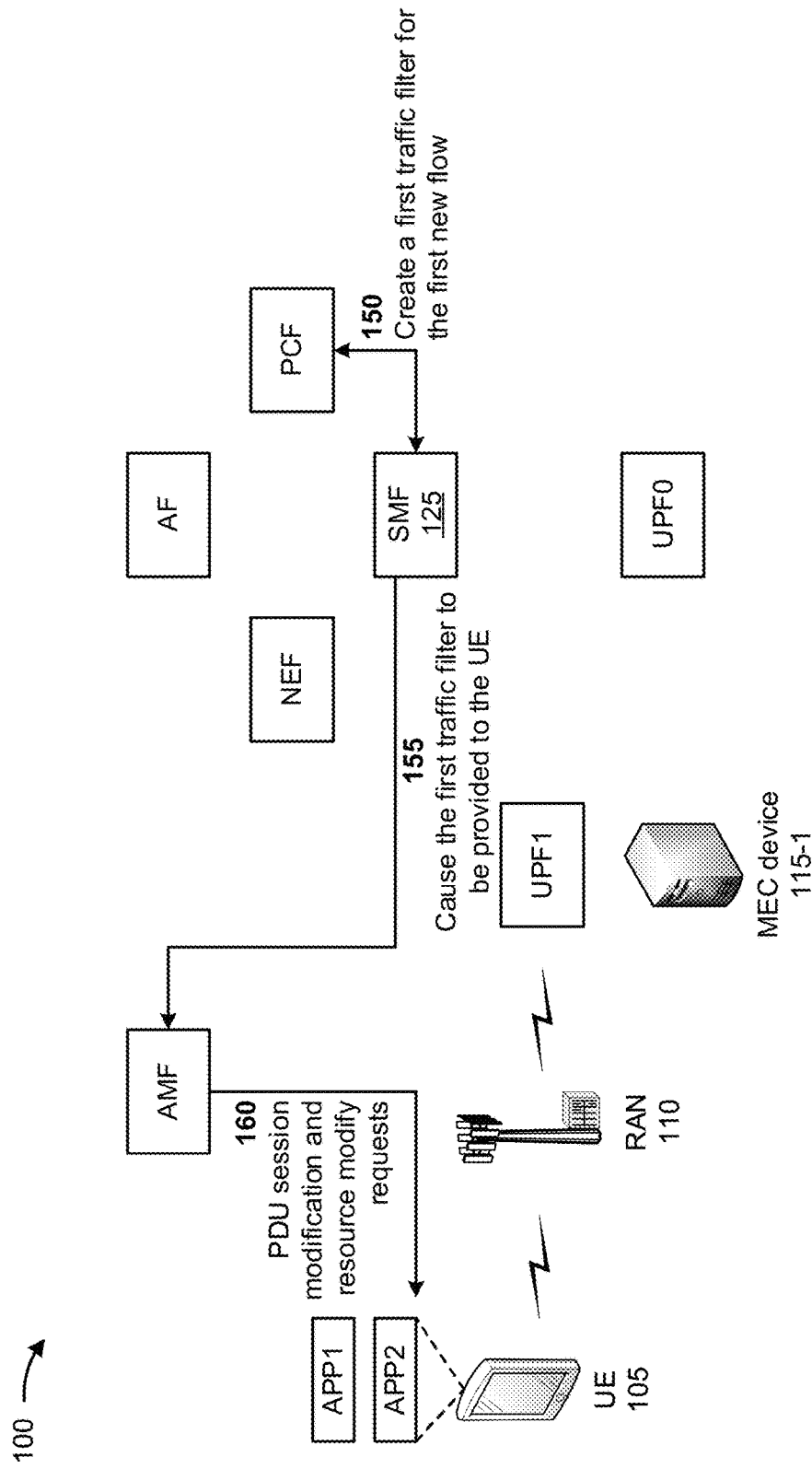

As shown in FIG. 1C, and by reference number 150, the SMF 125 and the PCF may create the first traffic filter for the first new flow. The first traffic filter may include QoS rules to be applied to traffic associated with the first application. In some implementations, the SMF 125 may receive the QoS rules from the PCF and may create the first traffic filter based on the QoS rules. The QoS rules may allocate a greater QoS to the first application traffic of the UE 105 than other traffic of the UE 105, such as a bulk file transfer.

As further shown in FIG. 1C, and by reference number 155, the SMF 125 may cause the first traffic filter to be provided to the UE 105. For example, the SMF 125 may provide the first traffic filter to the AMF and may instruct the AMF to provide the first traffic filter to the UE 105. In some implementations, the SMF 125 may cause the AMF to provide a PDU session modification request, with the first traffic filter, to the UE 105 and may cause the AMF to provide a radio resource control (RRC) configuration update, with a prioritization of the first application traffic, to the UE 105. In this way, the QoS rules associated with the first traffic filter may be applied to the traffic associated with the first application.

As further shown in FIG. 1C, and by reference number 160, the AMF may provide the PDU session modification request, with the first traffic filter, to the UE 105 and may provide a PDU session resource modify request to the UE 105. In one example, the PDU session modification request may include the following syntax {Requested $Q$oS rules, Packet filter, Requested $Q$oS flow descriptions}, where the Requested $Q$oS rules correspond to the $Q$oS rules used to the create the first traffic filter, the Packet filter corresponds to the first traffic filter, and the Request $Q$oS flow descriptions correspond to the first new flow. In one example, the PDU session resource modify request may include the following syntax {$Q$oS Flow Add, NAS PDU (PDU Session Modification Request)}, where the $Q$oS Flow Add corresponds to $Q$oS rules used to create the first traffic filter and the NAS PDU (PDU Session Modification Request) corresponds to the PDU session modification request. In some implementations, the AMF may provide the PDU session resource modify request, with the first traffic filter, to the RAN 110 associated with the UE 105. The RAN 110 may provide, based on the PDU session resource modify request, the first traffic filter to the UE 105 via the RRC configuration update. The RRC configuration update may include a prioritization to support the first application traffic based on the QoS rules used to create the first filter.

Figure 1D:
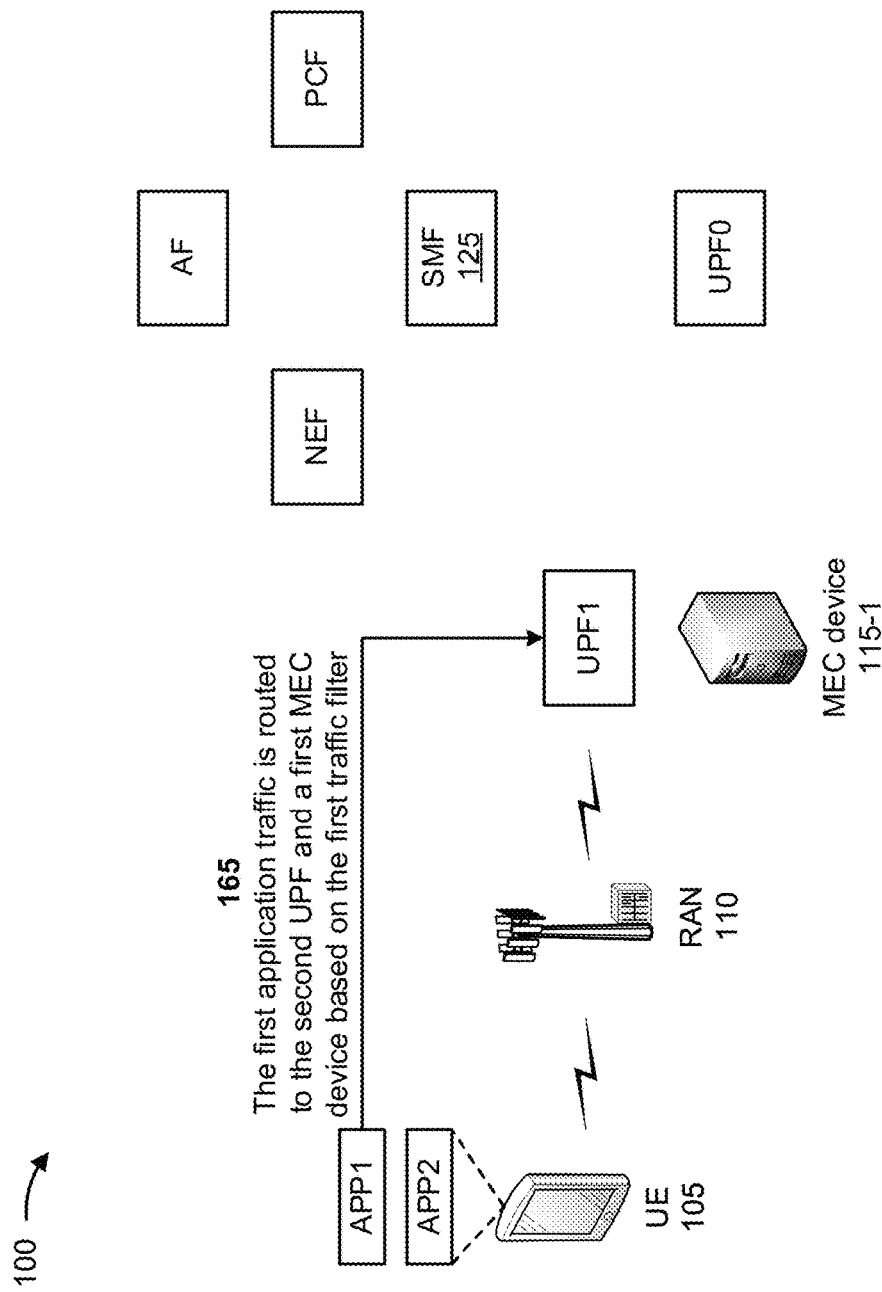

As shown in FIG. 1D, and by reference number 165, the first application traffic is routed to the second UPF (e.g., UPF1) and the first MEC device 115-1 based on the first traffic filter. In some implementations, the UE 105 may execute the first traffic filter at a chipset level of the UE 105 so that the first application traffic is routed to the second UPF and the first MEC device 115-1 associated with the second UPF. The first application traffic of the UE 105 may be allocated a greater QoS than a QoS allocated to other traffic of the UE 105, such as a bulk file transfer, the second application traffic, and/or the like.

Figure 1E:
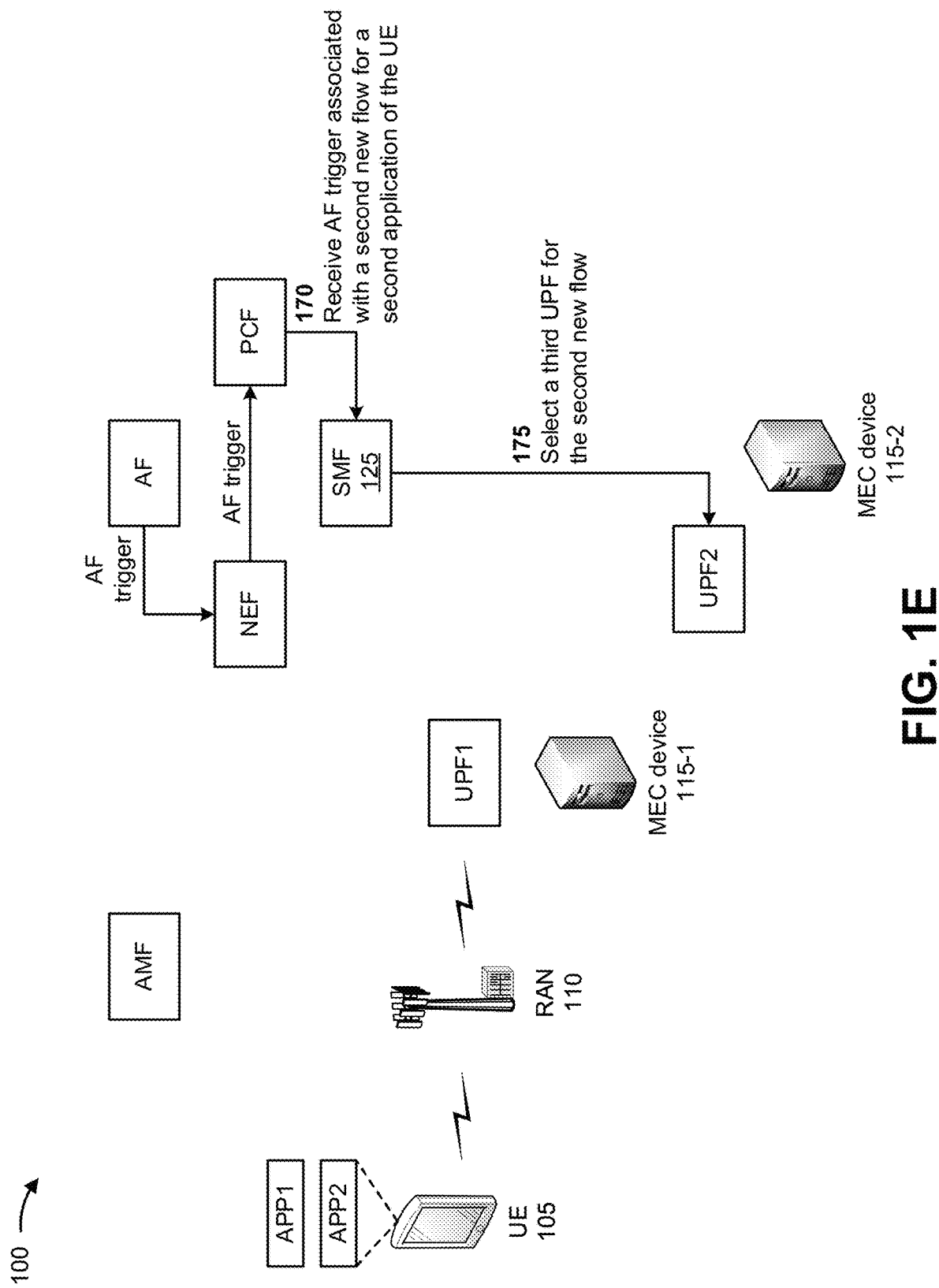

As shown in FIG. 1E, the AF may generate another AF trigger and may provide the other AF trigger to the NEF. The other AF trigger may be associated with a second new flow for the second application of the UE 105. The AF may receive, from the SMF 125, an indication of utilization of the second application by the UE 105 and may generate the other AF trigger based on the indication. The other AF trigger may include information identifying the UE 105 (e.g., an IMSI, a SUPI, and/or the like), the second application of the UE 105, the second new flow for the second application, and/or the like. As further shown, the NEF may provide the other AF trigger to the PCF and the PCF may provide the other AF trigger to the SMF 125.

As further shown in FIG. 1E, and by reference number 170, the SMF 125 may receive, from the PCF, the other AF trigger associated with the second new flow for the second application of the UE 105. The SMF 125 may process the other AF trigger to identify the UE 105, the second application of the UE 105, and the second new flow for the second application, and/or the like.

As further shown in FIG. 1E, and by reference number 175, the SMF 125 may select the third UPF (e.g., UPF2) for the second new flow. The SMF 125 may select the third UPF for the second new flow so that a particular QoS may be applied to the second new flow and the second application. For example, the other AF trigger may cause the SMF 125 to select the third UPF for the second new flow. In some implementations, the SMF 125 may select the third UPF based on a traffic load of the second new flow, a geographic location of the third UPF relative to the UE 105, a flow type of the second new flow, and/or the like.

Figure 1F:
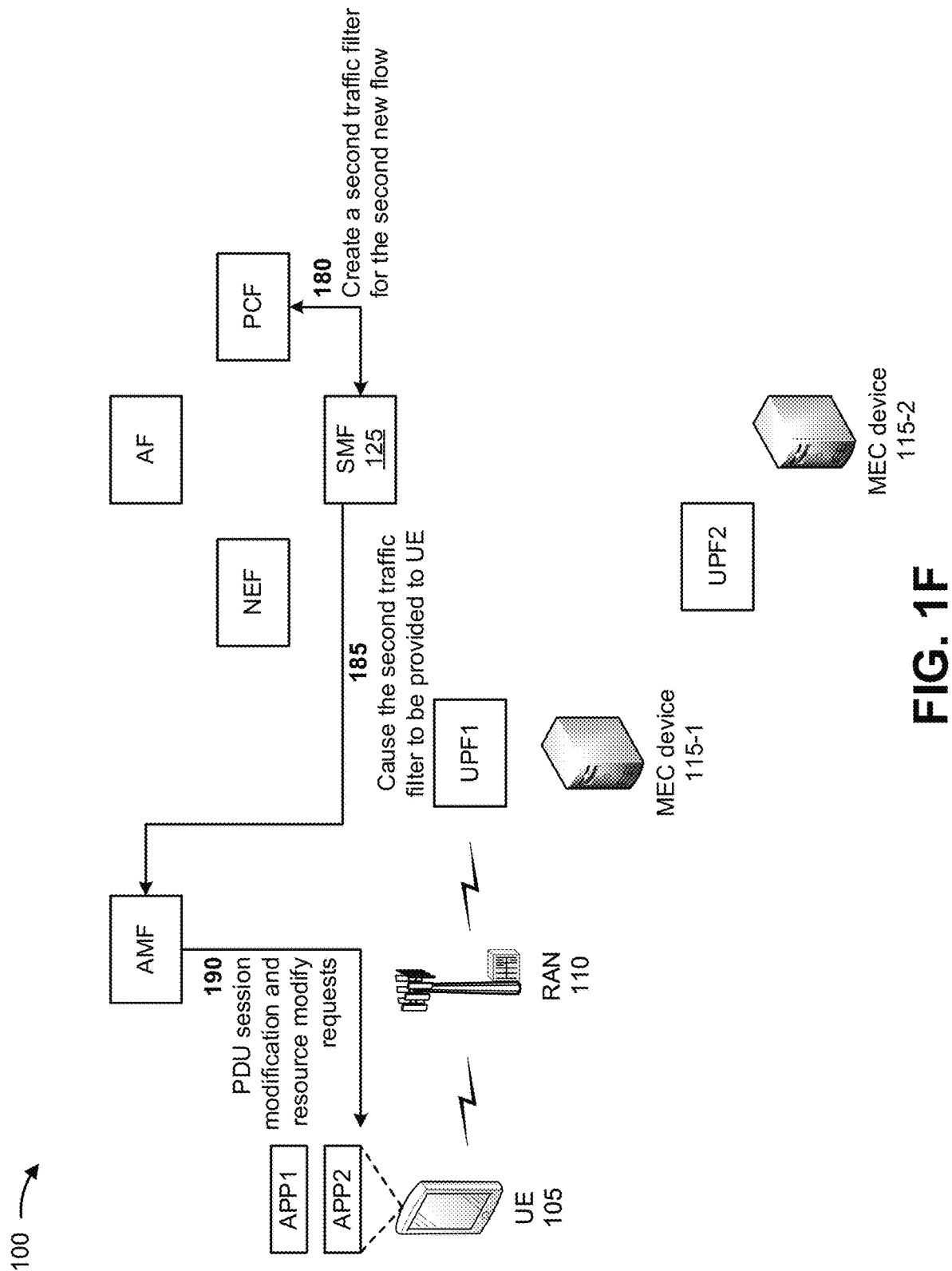

As shown in FIG. 1F, and by reference number 180, the SMF 125 and the PCF may create the second traffic filter for the second new flow. The second traffic filter may include QoS rules to be applied to traffic associated with the second application. In some implementations, the SMF 125 may receive the QoS rules from the PCF and may create the second traffic filter based on the QoS rules. The QoS rules may allocate a greater QoS to the second application traffic of the UE 105 than other traffic of the UE 105, such as a bulk file transfer or the first application traffic.

As further shown in FIG. 1F, and by reference number 185, the SMF 125 may cause the second traffic filter to be provided to the UE 105. For example, the SMF 125 may provide the second traffic filter to the AMF and may instruct the AMF to provide the second traffic filter to the UE 105. In some implementations, the SMF 125 may cause the AMF to provide a PDU session modification request, with the second traffic filter, to the UE 105 and may cause the AMF to provide a RRC configuration update, with a prioritization of the second application traffic, to the UE 105.

As further shown in FIG. 1F, and by reference number 190, the AMF may provide the PDU session modification request, with the second traffic filter, to the UE 105 and may provide a PDU session resource modify request to the UE 105. In one example, the PDU session modification request may include the following syntax {Requested $Q$oS rules, Packet filter, Requested $Q$oS flow descriptions}, where the Requested $Q$oS rules correspond to the QoS rules used to the create the second traffic filter, the Packet filter corresponds to the second traffic filter, and the Request $Q$oS flow descriptions correspond to the second new flow. In one example, the PDU session resource modify request may include the following syntax {$Q$oS Flow Add, NAS PDU (PDU Session Modification Request)}, where the $Q$oS Flow Add corresponds to QoS rules used to create the second traffic filter and the NAS PDU (PDU Session Modification Request) corresponds to the PDU session modification request. In some implementations, the AMF may provide the PDU session resource modify request, with the second traffic filter, to the RAN 110 associated with the UE 105. The RAN 110 may provide, based on the PDU session resource modify request, the second traffic filter to the UE 105 via the RRC configuration update. The RRC configuration update may include a prioritization to support the second application traffic based on the QoS rules used to create the second filter.

Figure 1G:
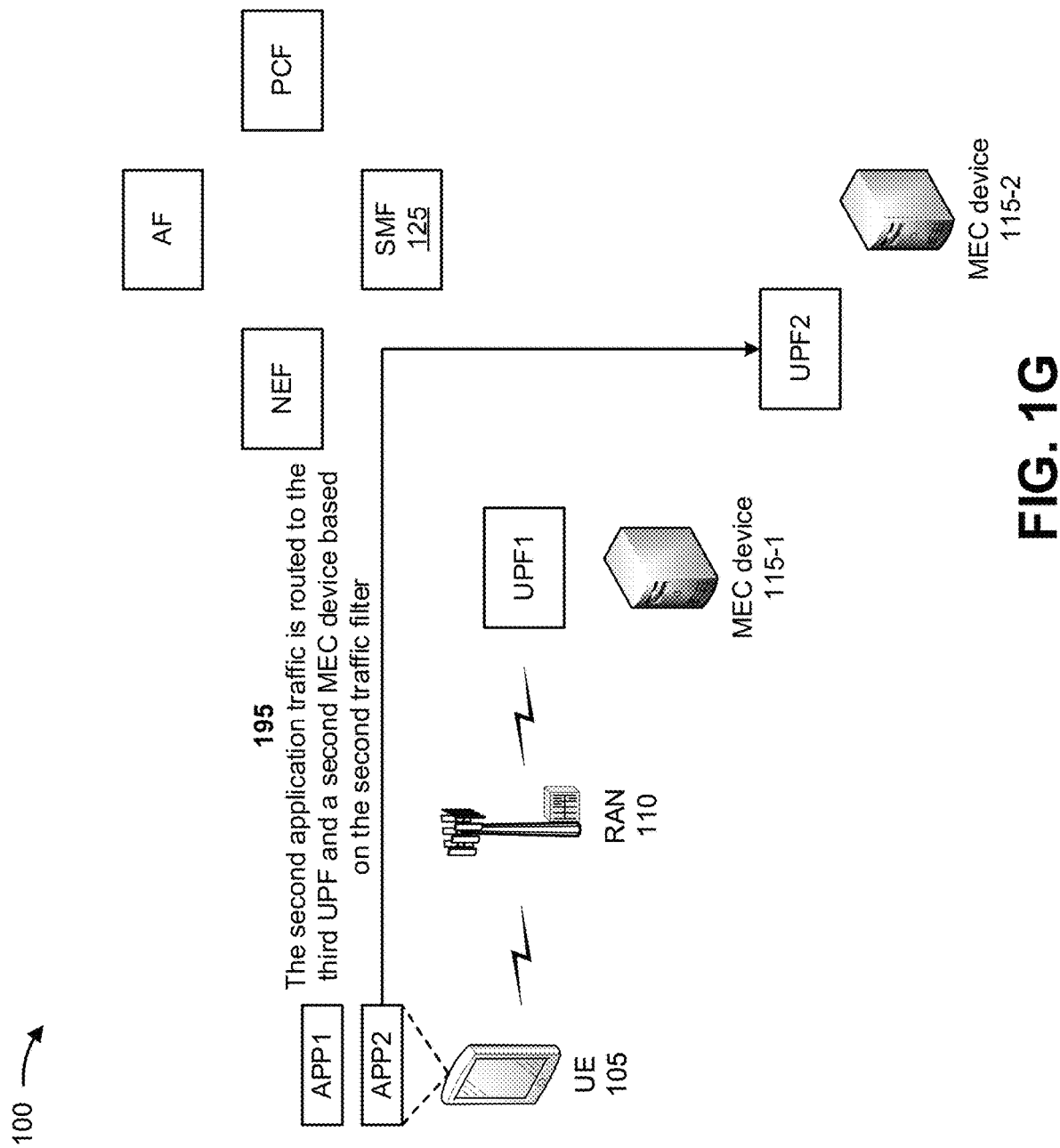

As shown in FIG. 1G, and by reference number 195, the second application traffic is routed to the third UPF (e.g., UPF2) and a second MEC device 115-2 (e.g., associated with the third UPF) based on the second traffic filter. In some implementations, the UE 105 may execute the second traffic filter at the chipset level of the UE 105 so that the second application traffic is routed to the third UPF and the second MEC device 115-2 associated with the third UPF. The second application traffic of the UE 105 may be allocated a greater QoS than a QoS allocated to other traffic of the UE 105, such as a bulk file transfer, the first application traffic, and/or the like.

In this way, the SMF 125 supports MEC using application-based QoS flows. The SMF 125 may divide traffic per application (e.g., an MEC-based application) at the UE 105 per flow level rather than per PDU session level. Moreover, the SMF 125 may enable logical channel prioritization to be utilized at the UE 105 to prioritize QoS flows when mapped to a DRB and to provide intra-UE inter-application uplink transmission prioritization (e.g., to support a low latency MEC application). Thus, the SMF 125 conserves computing resources, networking resources, and/or the like that would otherwise be consumed in addressing a poor user experience for application traffic at the UE 105, handling customer complaints associated with the poor user experience, handling traffic with an unnecessary QoS, depending on URSP support from the UE 105, among other examples.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
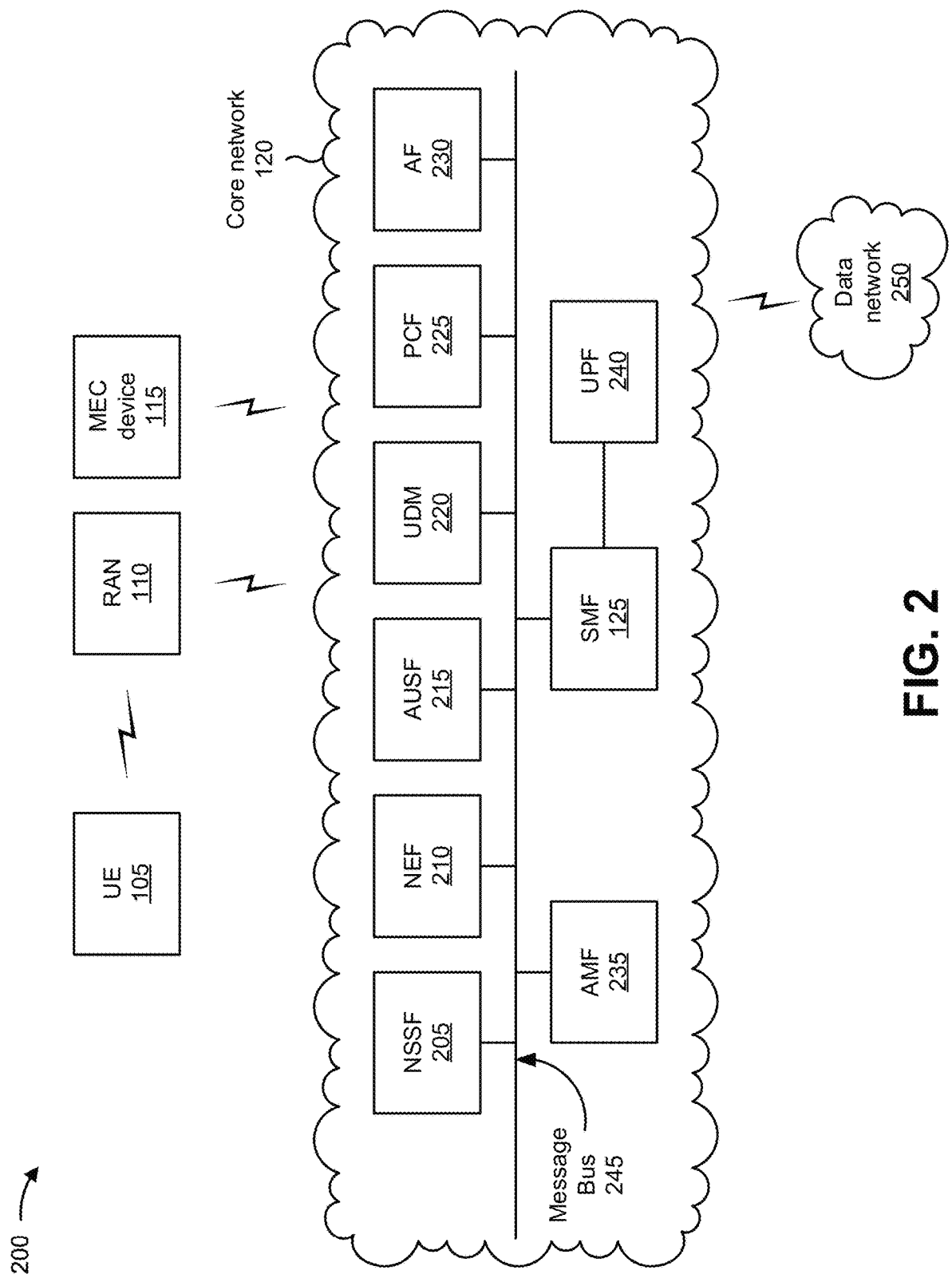
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include the UE 105, the RAN 110, the MEC device 115, the core network 120, the SMF 125, and a data network 250. Devices and/or networks of example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart wristwatch, a pair of smart glasses, a head mounted display, or a virtual reality headset), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, and/or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 120.

In some implementations, the RAN 110 may perform scheduling and/or resource management for the UE covered by the RAN 110 (e.g., the UE covered by a cell provided by RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, and/or a similar module or component. In other words, the RAN 110 may perform network control, scheduling, and/or network management functions (e.g., for uplink, downlink, and/or sidelink communications of the UE 105 covered by the RAN 110).

The MEC device 115 includes one or more devices capable of receiving, generating, storing, processing, providing, and/or routing information, as described elsewhere herein. The MEC device 115 may include a communication device and/or a computing device. For example, the MEC device 115 may include a server, such as an application server, a client server, a web server, a database server, a host server, a proxy server, a virtual server (e.g., executing on computing hardware), or a server in a cloud computing system. In some implementations, the MEC device 115 includes computing hardware used in a cloud computing environment.

In some implementations, the core network 120 may include an example functional architecture in which systems and/or methods described herein may be implemented. For example, the core network 120 may include an example architecture of a 5G next generation (NG) core network included in a 5G wireless telecommunications system. While the example architecture of the core network 120 shown in FIG. 2 may be an example of a service-based architecture, in some implementations, the core network 120 may be implemented as a reference-point architecture and/or a 4G core network, among other examples.

As shown in FIG. 2, the core network 120 may include a number of functional elements. The functional elements may include, for example, a network slice selection function (NSSF) 205, an NEF 210, an authentication server function (AUSF) 215, a unified data management (UDM) component 220, a PCF 225, an AF 230, an AMF 235, the SMF 125, and/or a user plane function (UPF) 240. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM 220 includes one or more devices that store user data and profiles in the wireless telecommunications system. The UDM 220 may be used for fixed access and/or mobile access in the core network 120.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 125 includes one or more devices that support the establishment, modification, and release of communication sessions in the wireless telecommunications system. For example, the SMF 125 may configure traffic steering policies at the UPF 240 and/or may enforce UE Internet protocol (IP) address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
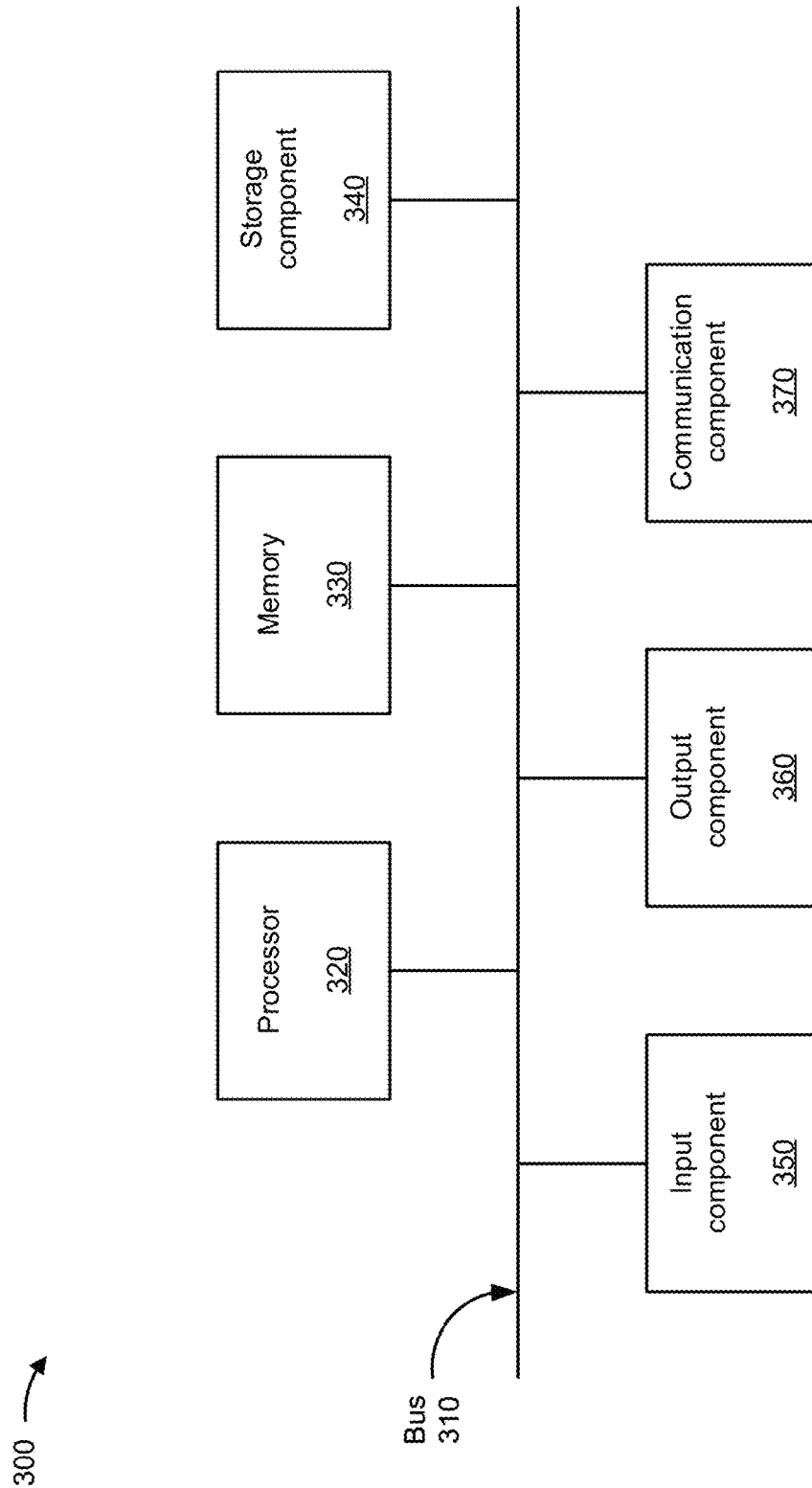
FIG. 3 is a diagram of example components of one or more devices of FIG. 2.

FIG. 3 is a diagram of example components of a device 300, which may correspond to the UE 105, the RAN 110, the SMF 125, the NEF 210, the AUSF 215, the UDM 220, the PCF 225, the AF 230, the AMF 235, and/or the UPF 240. In some implementations, the UE 105, the RAN 110, the SMF 125, the NEF 210, the AUSF 215, the UDM 220, the PCF 225, the AF 230, the AMF 235, and/or the UPF 240 may include one or more devices 300 and/or one or more components of device 300. As shown in FIG. 3, device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
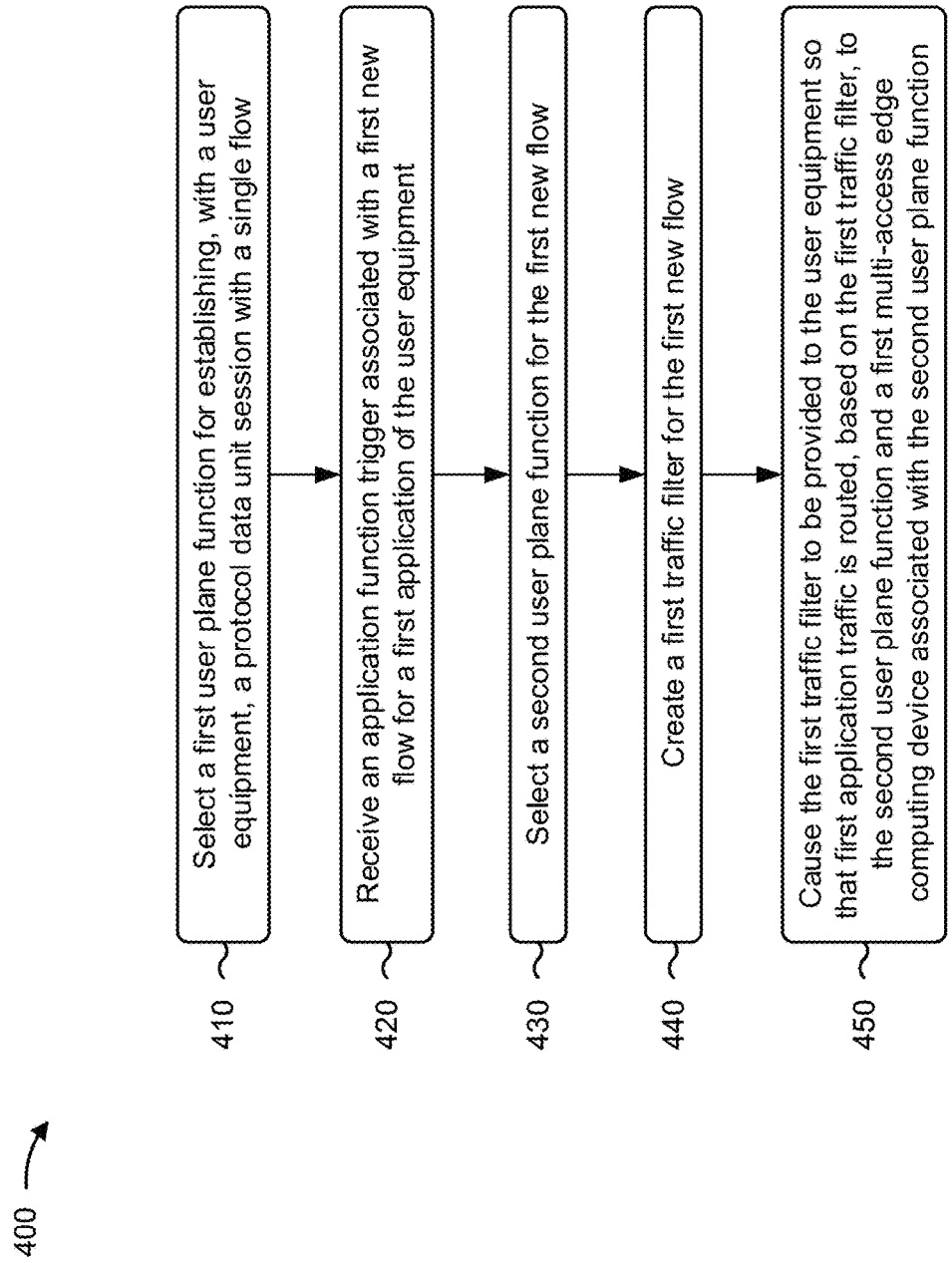
FIG. 4 is a flowchart of an example process for supporting MEC using application-based QoS flows.

FIG. 4 is a flowchart of an example process 400 for supporting MEC using application-based QoS flows. In some implementations, one or more process blocks of FIG. 4 may be performed by a network device (e.g., the SMF 125). In some implementations, one or more process blocks of FIG. 4 may be performed by another device or a group of devices separate from or including the network device, such as an NSSF (e.g., the NSSF 205), an NEF (e.g., the NEF 210), an AUSF (e.g., the AUSF 215), a UDM (e.g., the UDM 220), a PCF (e.g., the PCF 225), an AF (e.g., the AF 230), an AMF (e.g., the AMF 235), and/or a UPF (e.g., the UPF 240). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include selecting a first user plane function for establishing, with a user equipment, a protocol data unit session with a single flow (block 410). For example, the network device may select a first user plane function for establishing, with a user equipment, a protocol data unit session with a single flow, as described above.

As further shown in FIG. 4, process 400 may include receiving an application function trigger associated with a first new flow for a first application of the user equipment (block 420). For example, the network device may receive an application function trigger associated with a first new flow for a first application of the user equipment, as described above. In some implementations, the application function trigger is generated by an application function and received from a policy control function.

As further shown in FIG. 4, process 400 may include selecting a second user plane function for the first new flow (block 430). For example, the network device may select a second user plane function for the first new flow, as described above.

As further shown in FIG. 4, process 400 may include creating a first traffic filter for the first new flow (block 440). For example, the network device may create a first traffic filter for the first new flow, as described above. In some implementations, the first traffic filter includes quality of service rules to be applied to first application traffic.

As further shown in FIG. 4, process 400 may include causing the first traffic filter to be provided to the user equipment so that first application traffic is routed, based on the first traffic filter, to the second user plane function and a first multi-access edge computing device associated with the second user plane function (block 450). For example, the network device may cause the first traffic filter to be provided to the user equipment so that first application traffic is routed, based on the first traffic filter, to the second user plane function and a first multi-access edge computing device associated with the second user plane function, as described above. In some implementations, the first application traffic is allocated a quality of service that is different than a quality of service allocated to traffic associated with a second application of the user equipment.

In some implementations, causing the first traffic filter to be provided to the user equipment includes causing an access and mobility management function to provide a protocol data unit session modification request, with the first traffic filter, to the user equipment, and causing the access and mobility management function to provide a radio resource control configuration update, with a prioritization of the first application traffic, to the user equipment.

In some implementations, causing the first traffic filter to be provided to the user equipment includes causing the user equipment to execute the first traffic filter at a chipset level of the user equipment so that the first application traffic is routed to the second user plane function and the first multi-access edge computing device associated with the second user plane function.

In some implementations, causing the first traffic filter to be provided to the user equipment includes causing an access and mobility management function to provide a protocol data unit session resource modify request, with the first traffic filter, to a radio access network associated with the user equipment, wherein the radio access network provides, based on the protocol data unit session resource modify request, the first traffic filter to the user equipment via a radio resource control configuration update.

Process 400 may include additional implementations, such as any single implementation or any combination of implementations described below and/or in connection with one or more other processes described elsewhere herein.

In some implementations, process 400 includes receiving another application function trigger associated with a second new flow for a second application of the user equipment, selecting a third user plane function for the second new flow, and creating a second traffic filter for the second new flow. In some implementations, the second traffic filter includes quality of service rules to be applied to second application traffic.

In some implementations, process 400 includes causing the second traffic filter to be provided to the user equipment so that second application traffic is routed, based on the second traffic filter, to the third user plane function and a second multi-access edge computing device associated with the third user plane function. In some implementations, causing the second traffic filter to be provided to the user equipment includes causing an access and mobility management function to provide a protocol data unit session modification request, with the second traffic filter, to the user equipment, and causing the access and mobility management function to provide a radio resource control configuration update, with a prioritization of the second application traffic, to the user equipment. In some implementations, causing the second traffic filter to be provided to the user equipment includes causing the user equipment to execute the second traffic filter at a chipset level of the user equipment so that the second application traffic is routed to the third user plane function and the second multi-access edge computing device associated with the third user plane function.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   selecting, by a network device, a first user plane function for establishing, with a user equipment, a protocol data unit session with a single flow;
   receiving, by the network device, an application function trigger associated with a first new flow for a first application of the user equipment; and
   causing, by the network device, a first traffic filter for the first new flow to be provided to the user equipment to enable the user equipment to provide intra-UE inter-application uplink transmission prioritization to support a low latency multi-access edge computing application by routing first application traffic, based on the first traffic filter, to a second user plane function and a first multi-access edge computing device associated with the second user plane function.

2. The method of claim 1, wherein causing the first traffic filter to be provided to the user equipment comprises:
   causing the user equipment to execute the first traffic filter at a chipset level of the user equipment so that the first application traffic is routed to the second user plane function and the first multi-access edge computing device associated with the second user plane function.

3. The method of claim 1, wherein causing the first traffic filter to be provided to the user equipment comprises:
   causing an access and mobility management function to provide a protocol data unit session modification request, with the first traffic filter, to the user equipment; and
   causing the access and mobility management function to provide a radio resource control configuration update, with a prioritization of the first application traffic, to the user equipment.

4. The method of claim 1, further comprising:
   receiving another application function trigger associated with a second new flow for a second application of the user equipment; and
   causing a second traffic filter for the second new flow to be provided to the user equipment to enable the user equipment to route second application traffic, based on the second traffic filter, to a third user plane function and a second multi-access edge computing device associated with the third user plane function.

5. The method of claim 4, wherein causing the second traffic filter to be provided to the user equipment comprises:
   causing an access and mobility management function to provide a protocol data unit session modification request, with the second traffic filter, to the user equipment; and
   causing the access and mobility management function to provide a radio resource control configuration update, with a prioritization of the second application traffic, to the user equipment.

6. The method of claim 1, wherein the first traffic filter includes quality of service rules to be applied to the first application traffic.

7. The method of claim 1, further comprising:
   selecting the second user plane function for the first new flow; and
   creating the first traffic filter for the first new flow.

8. A network device, comprising:
   one or more memories; and
   one or more processors, coupled to the one or more memories, configured to:
      select a first user plane function for establishing, with a user equipment, a protocol data unit session with a single flow;
      receive an application function trigger associated with a first new flow for a first application of the user equipment; and
      cause a first traffic filter for the first new flow to be provided to the user equipment to enable the user equipment to provide intra-UE inter-application uplink transmission prioritization to support a low latency multi-access edge computing application by routing first application traffic, based on the first traffic filter, to a second user plane function and a first multi-access edge computing device associated with the second user plane function.

9. The network device of claim 8, wherein the one or more processors, to cause the first traffic filter to be provided to the user equipment, are configured to:
   cause the user equipment to execute the first traffic filter at a chipset level of the user equipment so that the first application traffic is routed to the second user plane function and the first multi-access edge computing device associated with the second user plane function.

10. The network device of claim 8, wherein the one or more processors, to cause the first traffic filter to be provided to the user equipment, are configured to:
    cause an access and mobility management function to provide a protocol data unit session modification request, with the first traffic filter, to the user equipment; and
    cause the access and mobility management function to provide a radio resource control configuration update, with a prioritization of the first application traffic, to the user equipment.

11. The network device of claim 8, wherein the one or more processors are further configured to:
    receive another application function trigger associated with a second new flow for a second application of the user equipment; and
    cause a second traffic filter for the second new flow to be provided to the user equipment to enable the user equipment to route second application traffic, based on the second traffic filter, to a third user plane function and a second multi-access edge computing device associated with the third user plane function.

12. The network device of claim 11, wherein the one or more processors, to cause the second traffic filter to be provided to the user equipment, are configured to:
    cause an access and mobility management function to provide a protocol data unit session modification request, with the second traffic filter, to the user equipment; and
    cause the access and mobility management function to provide a radio resource control configuration update, with a prioritization of the second application traffic, to the user equipment.

13. The network device of claim 8, wherein the first traffic filter includes quality of service rules to be applied to the first application traffic.

14. The network device of claim 8, wherein the one or more processors are further configured to:
    select the second user plane function for the first new flow; and
    create the first traffic filter for the first new flow.

15. A non-transitory computer-readable medium storing a set of instructions, the set of instructions comprising:
    one or more instructions that, when executed by one or more processors of a network device, cause the network device to:
       select a first user plane function for establishing, with a user equipment, a protocol data unit session with a single flow;
       receive an application function trigger associated with a first new flow for a first application of the user equipment; and
       cause a first traffic filter for the first new flow to be provided to the user equipment to enable the user equipment to provide intra-UE inter-application uplink transmission prioritization to support a low latency multi-access edge computing application by routing first application traffic, based on the first traffic filter, to a second user plane function and a first multi-access edge computing device associated with the second user plane function.

16. The non-transitory computer-readable medium of claim 15, wherein the one or more instructions, that cause the first traffic filter to be provided to the user equipment, cause the network device to:
    cause the user equipment to execute the first traffic filter at a chipset level of the user equipment so that the first application traffic is routed to the second user plane function and the first multi-access edge computing device associated with the second user plane function.

17. The non-transitory computer-readable medium of claim 15, wherein the one or more instructions, that cause the first traffic filter to be provided to the user equipment, further cause the network device to:
    cause an access and mobility management function to provide a protocol data unit session modification request, with the first traffic filter, to the user equipment; and
    cause the access and mobility management function to provide a radio resource control configuration update, with a prioritization of the first application traffic, to the user equipment.

18. The non-transitory computer-readable medium of claim 15, wherein the one or more instructions further cause the network device to:

receive another application function trigger associated with a second new flow for a second application of the user equipment; and cause a second traffic filter for the second new flow to be provided to the user equipment to enable the user equipment to route second application traffic, based on the second traffic filter, to a third user plane function and a second multi-access edge computing device associated with the third user plane function.

19. The non-transitory computer-readable medium of claim 18, wherein the one or more instructions, that cause the second traffic filter to be provided to the user equipment, further cause the network device to:

cause an access and mobility management function to provide a protocol data unit session modification request, with the second traffic filter, to the user equipment; and cause the access and mobility management function to provide a radio resource control configuration update, with a prioritization of the second application traffic, to the user equipment.

20. The non-transitory computer-readable medium of claim 15, wherein the one or more instructions further cause the network device to:

select the second user plane function for the first new flow; and create the first traffic filter for the first new flow.

\* \* \* \* \*